L. I. HENRY.
SELF LEVELING APPARATUS.
APPLICATION FILED JUNE 1, 1920.
1,404,523.
Patented Jan. 24, 1922.
3 SHEETS—SHEET 1.
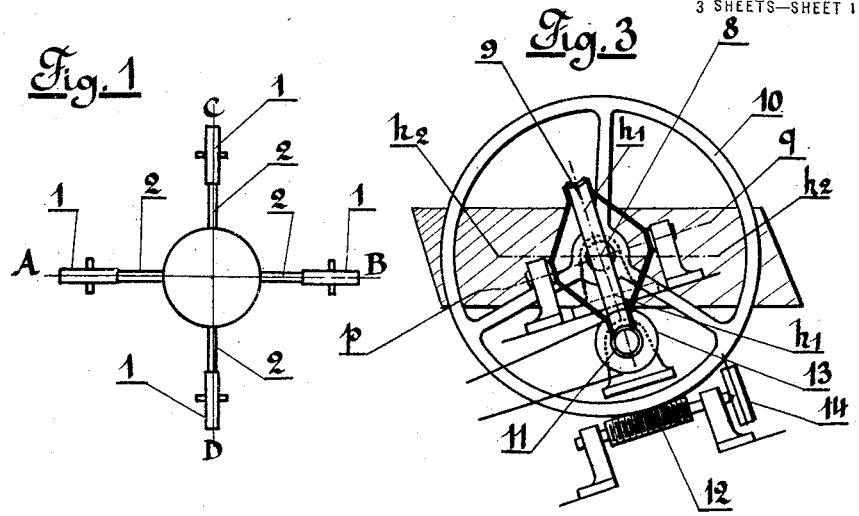
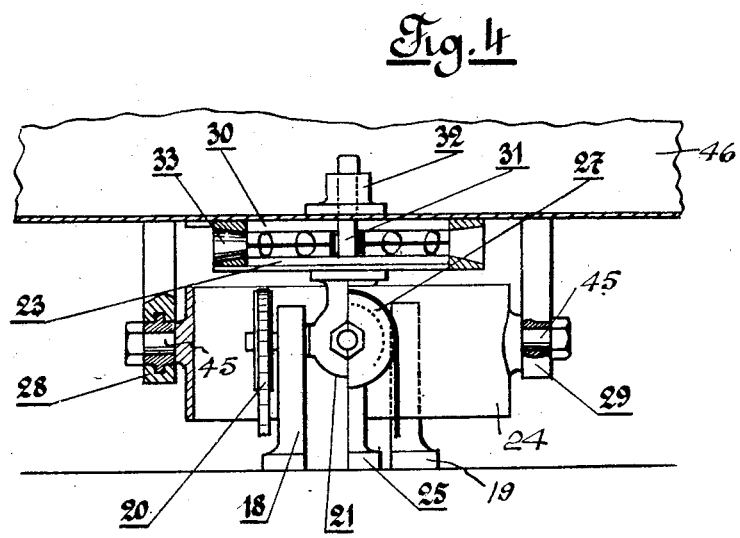
Inventor
L. I. Henry
By H. R. Kerslake
Attorney

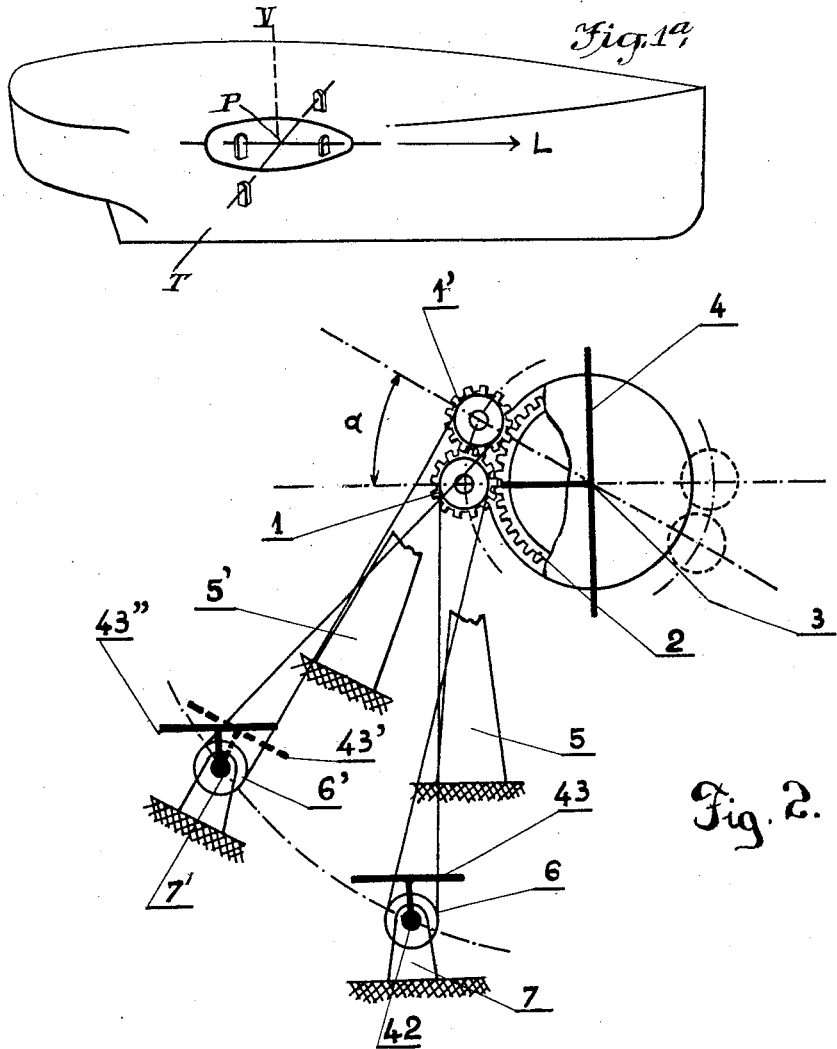

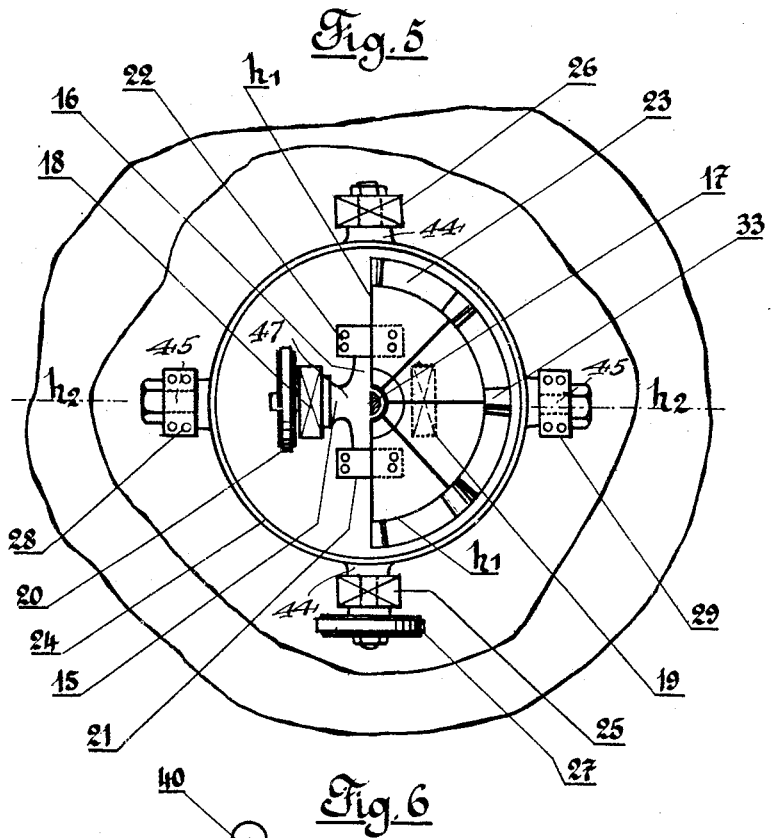
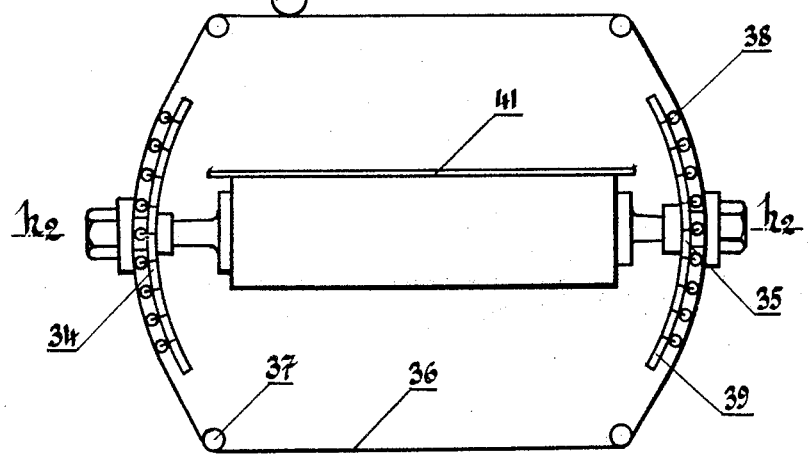

UNITED STATES PATENT OFFICE.

LOUIS ISIDORE HENRY, OF TOULON, FRANCE.

SELF-LEVELING APPARATUS.

1,404,523. Specification of Letters Patent. Patented Jan. 24, 1922.

Application filed June 1, 1920. Serial No. 385,866.

*To all whom it may concern:*

Be it known that I, Louis Isidore Henry, a citizen of the French Republic, residing at Toulon, Var, France, have invented certain new and useful Improvements in Self-Leveling Apparatus, of which the following is a specification.

This invention has for its object a device enabling the provision aboard all vessels travelling in the air or on or through the water, and subject to the oscillation attendant upon pitching and rolling, of motionless compartments, i. e., sections of the vessel, large or small, so equipped by mechanical means that no movement may take place therein beyond that implied in the translation of the general centre of gravity of the vessel. This stationary compartment or chamber is essentially constituted by a platform constrained to remain horizontal, whatever may be the movements of the vessel, by the action of two shafts perpendicular to each other whose axes pass constantly through a fixed point of the vessel and are themselves constrained to remain constantly horizontal by the action of a device in fixed relation to the vessel controlled by an automatic stabilizing apparatus. This stabilizing apparatus carries toothed sectors with which mesh pinions whose axes are carried by the vessel; during the oscillatory movements of the latter the pinions rolling on the toothed sectors turn about their axes in relation to the vessel. The rolling of the pinions on the toothed sectors is utilized to give at each instant to the shafts controlling the platform simple movements counteracting constantly and exactly the movements resulting from the displacement of this platform by the vessel.

In the accompanying drawing:

Figure 1 shows diagrammatically the positions of the four pinions and of the toothed sectors of the stabilizing apparatus when the vessel is in an upright position.

Figure 1ª shows diagrammatically the vessel itself in upright position.

Figure 2 shows diagrammatically, projected on the plane of symmetry of the vessel, a diagram demonstrating the invention assuming that the vessel is only subjected to a pitching movement.

Figure 3 shows similarly, projected on the same plane of symmetry, a complete demonstration diagram of the invention.

Figures 4 and 5 show respectively, projected on the plane of symmetry of the vessel and on the horizontal plane, a construction for carrying the invention into effect.

Figure 6 shows, projected on a vertical plane a modified construction according to the invention.

When a vessel pitches or rolls it is known that, in conformity with the general principles of mechanics, its movements about any fixed point P (Fig. 1ª) in passing from one position to an infinitely close position can be represented by a simple rotation about an axis passing through the point P. This rotation can be resolved into simple rotations about three axes mutually at right angles passing through the same point and these axes can be chosen in fixed relation to the vessel and moving therewith. When the vessel is at rest these axes will occupy the following positions; one PL horizontal and parallel to the vertical plane of symmetry of the vessel, the second PT horizontal and normal to this plane, and the third PV vertical. When the vessel, by pitching or rolling comes from its vertical position into a neighboring position, the axis PL displaced with the vessel is a line which is no longer necessarily horizontal traced in the new position of the plane of symmetry which has a certain inclination to its position when the vessel is upright; the simple rotation about this line will have the effect of causing this inclination to vary (rolling effect). The axis PT in its new position is normal to the new position of the plane of symmetry; the simple rotation about this axis has the effect, in the new position of the plane of symmetry, of causing the longitudinal section of the vessel to turn through this plane (pitching effect). Finally the axis PV in its new position is normal to the plane of the two other axes. The simple rotation about this axis will have the effect of producing a side rocking movement of the vessel. Now this need not be considered owing to the resistance of the water on the whole hull of the vessel, partly on one side and partly on the other.

It may be considered therefore that the pitching and rolling movements of the vessel about any point result solely in simple successive rotations which take place at each moment about the actual positions of the two axes passing through the said point, in fixed relation to the vessel and moving therewith and which, in the upright position of the vessel at rest, are horizontal and one—axis L—parallel to the vertical plane of symmetry of the vessel, and the other—axis T—perpendicular to this plane.

This assumed, referring to Figure 3 for which the plane of the drawing is the plane of symmetry of the vessel in a certain position $a$, the point 8 is a point called the central point common to the vessel and to the stationary chamber. The axis T of this point projects at 8 and the axis L is a line $p\,q$ located in the plane of the figure. According to the present invention each of these two axes is the axis of a shaft journalled in the fixed frame of the vessel. On these shafts are keyed respectively the circles 9 and 10 whose planes are normal to the axes of the shafts. The actual intersection of each of these circles with the horizontal plane passing through the point 8 gives in the circle 9 a line projected along $h_1\,h_1$ and in the circle 10 the line $h_2\,h_2$. These two lines are horizontal and determine a truly horizontal plane, but, owing to the simple rotations about the axes L and T producing displacement of the vessel about the point 8 from the position $a$ to an infinitely close position $b$, the two lines $h_1\,h_1$ and $h_2\,h_2$ and their planes will no longer be horizontal.

On the contrary if it is supposed that the circle 9 receives about the line $p\,q$ a rotation equal to and of a direction opposite to the simple rotation of movement of the vessel about the axis L, for example, by the tangent worm 11 carried by the fixed frame of the vessel, the two rotations will counteract each other and the diameter of the circle 9 which was horizontal in the position $a$ of the vessel, remains horizontal when the vessel has passed from the position $a$ to the position $b$. Similarly if the circle 10 receives a rotation equal and opposite to the rotation of the movement of the vessel about the axis T, for example, by the worm screw 12 carried by the fixed frame of the vessel, and the pulley 14 operated by a motor different from the first and similarly carried by the vessel, the diameter of the circle 10 horizontal in the position $a$ of the vessel will be still horizontal in the position $b$. The plane formed by these two diameters traced on the circles will keep its horizontal position step by step in all the successive positions of the vessel, so that if this plane is made initially horizontal when the ship is upright and at rest, it will remain horizontal during all disturbances of the vessel by pitching or rolling.

The rotations destroying movement of the stationary chamber when the vessel pitches and rolls are produced in the following manner; the motors fixed to the vessel, as has been mentioned above, are coupled and their regulators are operated by an automatic stabilizing apparatus which, whatever may be the system and details of construction comprise the following essential parts:

(1) A spindle 4 (Figure 2) passing through a point 3 of the vessel, referred to as the point of suspension, which remains substantially vertical whatever may be the movements of rolling and pitching.

(2) Four toothed sectors 2 (Figures 1 and 2) whose primary circles meshing with the pinions 1 hereinbefore mentioned appertain to the same sphere having the point of suspension 3 for centre.

Figure 1 shows the manner in which the pinions are disposed when the vessel is in an upright position. These pinions 1, to the number of four, are mounted on axes which are in fixed relation to the vessel and are moved therewith. When the vessel is in an upright position at rest, the centres of the pinions are at the ends of two diameters, perpendicular to each other, of a horizontal circumference, which are identically the axes L and T of the point of suspension 3. Carried by the vessel, these two diameters remain the axes L and T of displacement of the vessel about this point at each instant. The pinions 1 engage the toothed sectors 2 (Figs. 1 and 2) by means of cheeks and also with their teeth, so that the toothed sectors are always maintained in two large circles of the sphere having the point of suspension as centre, these large circles being perpendicular to each other and intersecting along the diameter of the said sphere which is normal to the plane of the two axes L and T.

When pitching or rolling occurs, during the simple rotation about the axis T, for example, of the vessel and of the axis of the pinions 1, the connections of the toothed sectors with the spindle 4 are such that the two diametrically opposite pinions which have their axes parallel at T only roll on the toothed sectors with which they are in mesh to an extent exactly proportional to the simple rotation of their own axes about T, whilst during the simple rotation about the axis L, the same two pinions become fixed in relation to their toothed sectors which they move with them during the rotation by the engagement of their cheeks.

By meshing with their toothed sectors, the two pinions considered above turning about their own axes proportional to the simple rotation about T, thus have in relation to the vessel a relative movement which is utilized to operate the controllers of the auxiliary motors fixed to the vessel which have been mentioned above. These auxiliary motors, therefore, rotate to an extent proportional to the simple rotation about T and they can transmit to the axis of the same name and same direction T of the central point of the stationary chamber a rotation equal and of an opposite direction to the rotation of movement about T. Similarly the auxiliary motors whose controllers are operated by the two other pinions can transmit to the axis L of the central point of the stationary chamber a rotation equal and of an opposite direction to that of the movement about this same axis.

It should be noted that in each pair of diametrically opposite pinions a single one only is necessary, but the two can operate at the same time, each operating its auxiliary motor but capable of being able to operate by itself if the auxiliary motor of the other suffers damage.

To study the operation of the device it is advantageous to commence by imagining the application of these theoretical considerations to the simple case when there is only one of the two movements; pitching and rolling, pitching alone for example. Figure 2 which relates to this, is drawn in the plane of symmetry of the vessel, a plane which in the absence of any rolling remains vertical. The axis T of the point of suspension 3 is fixed and horizontal whatever may be the pitching and is projected at 3. The axis L remains in the plane of the drawing, turning about 3, no simple rotation taking place about this, whatever may be its position.

The left hand pinion 1 of the figure will alone be considered. It operates the controller of an auxiliary motor 5 fixed to the vessel which, in its turn, controls a pulley 6 keyed on a shaft 7 resting on the framework 42 fixed to the vessel. In fixed relation to this shaft is a platform 43 which is horizontal when the vessel is at rest in an upright position. The connections of the toothed sector 2 with the spindle 4 leave the sector in place without movement. When the vessel has pitched through an angle $\alpha$ the pinion has rolled on the fixed sector 2 and turned about its own axis an angle proportional to $\alpha$; it follows from this that the motor 5 moves to 5', the shaft 7 to 7'.

If the auxiliary motor 5 did not operate, the platform 43 would move to 43', but the auxiliary motor destroying the movement of translation about the axis T of the central point which is here the axis of the shaft 7, the platform 43 is moved to 43''.

Figures 4 and 5 show a practical method of carrying out the invention for the general case when there is pitching and rolling. In these figures the apparatus is shown such as it is when the vessel is in an upright position at rest. The central point is the point 17, at which meets the two arms 15 and 16 of a member 47 having two arms perpendicular to each other. The axis of the arm 15 is the axis L of the central point. This arm is connected to the vessel by resting in the two bearings 18 and 19 fixed to the vessel; it receives a movement of rotation by the pulley 20 moved by the auxiliary motor fixed to the vessel, not shown on the figure and which is operated by a pinion having an axis parallel to L. The other arm 16 is constantly maintained horizontal in the transverse plane moved by the vessel, owing to the said movement of rotation of the arm 15. About the axis of this arm can turn two bearings 21 and 22 which support a platform 23 riveted to their blocks.

It will be seen that the device just described corresponds exactly to the first device of the demonstration Figure 3 (circle 9, tangent screw 11, pulley 13), the axis of the arm 16 corresponding to the line $h_1 h_1$.

About the two armed members 15, 16 is disposed a second member 24 having two arms similarly perpendicular to each other and intersecting at the central point 17. This member is analogous to the preceding one except that it is necessarily hollow about the central point. It is formed by the ring 24 to which are fixed on the one hand the interrupted shaft 44 carried by the bearings 25 and 26 fixed to the vessel, and whose axis is the axis T of the central point. It receives a movement of rotation about itself by means of the pulley 27, moved by a second auxiliary motor fixed to the vessel, not shown on the drawing, and operated by a pinion having an axis parallel to T'. There is also fixed to the ring 24 an interrupted shaft 45 having its axis maintained constantly horizontal, in the plane of symmetry of the vessel, by the rotation of the shaft 44. About this can turn two bearings 28 and 29 supporting a second platform 30 in fixed relation to the stationary chamber 46.

It will be seen that this second member corresponds to the first device (circle 10 tangent screw 14) of Figure 3 and that the axis of the interrupted shaft 45 corresponds to the line $h_2 h_2$ of Figure 3.

The two platforms are compelled to remain parallel in such a way that they cannot be other than horizontal; to this end one of them, 23 for example, carries an axis 31, perpendicular to it and passing through the central point, while the other carries a socket 32, also perpendicular, through the center of which passes axis 31; moreover, as the angle of the two lines maintained in a horizontal position, which is 90° when the vessel is in an upright posture, becomes modified when the latter is pitching and rolling, the two platforms must be able to turn, with respect to one another, about their common perpendicular; for this purpose a set of friction rollers 33 is placed between the two platforms.

It is unnecessary to materialize the axis of rotation passing through the central point. Thus, for instance, in the method of carrying out the invention shown in Fig. 6, the axis $h_2 h_2$ which is to be maintained in a horizontal position turning about the axis T of the central point, is engaged in two sockets 34 and 35 introduced into a belt 36 of bars, ropes and chains which run on pulleys 37 fixed into that hold of the vessel in which the motionless compartment is situated and which does not vary in length during the movements of the vessel. Each socket with the rope pertaining thereto is carried by the rollers 38 attached to the sectors 39 which are rigidly fixed to the vessel, and has its centre at the central point. The belt is actuated from any convenient point by an auxiliary motor 40. The sockets 34 and 35 are firmly secured to the platform 41. The second group might be disposed in the same way as in the arrangement described above.

It has been taken for granted in the foregoing that the axes of rotation of the vessel around the point from which the stabilizing apparatus is suspended (lines connecting the centres of the pinions diametrically opposite to one another) were as regards one of them parallel to the diametral plane of symmetry of the vessel and as regards the other perpendicular to this plane. There is, however, no objection to their being any two diameters of the circle passing through the centres of the pinions provided that they be perpendicular to one another; the axes of rotation around the central point will always be drawn parallel to these diameters. Nevertheless, such a solution would certainly be less satisfactory than that proposed in the foregoing.

Neither of the auxiliary motors driving the pulleys 20 and 27 operates unless the corresponding pinion is running effectively on its toothed sector in the stabilizing apparatus. On the other hand, the pendulum of this apparatus is not absolutely immobile; from which facts it results that the lines $h_1 h_1$ and $h_2 h_2$ do not remain absolutely horizontal and that the motionless compartment participates in the oscillation of the pendulum. The effect will, however, be imperceptible, for the principle of the stabilizing apparatus is that this oscillation shall be very slight, not more than a few divisions of a degree, and shall, moreover, occupy a much greater length of time than the oscillations of the vessel.

The effect of the non-coincidence of the central point 17 with the general centre of gravity of the vessel is that during the oscillation of the said vessel the central point describes a certain curve on a sphere the centre of which is the general centre of gravity of the vessel and the radius the distance from this point to the central point. The consequence of this is that the motionless compartment is, together with the central point, involved in the motion attendant upon the translation of the whole vessel with respect to the supposedly stationary centre of gravity, in one of three directions, namely longitudinal horizontal, transversal horizontal and vertical. As these movements may be felt to a certain extent by the occupants of the motionless compartment, though insufficiently to cause them any inconvenience, they may be reduced to a minimum at which they will be imperceptible by placing the central point in the mean position of the centre of gravity as determined by calculation and experiment. The movement of the central point will then be approximately the same as that of the centre of gravity, which latter movement can cause no inconvenience to the persons who may participate therein.

In the event of accident to the auxiliary motor which drives the pulley 20, for instance, the line $h_1 h_1$, horizontal at the time of the accident, will from that time onwards be involved in the motion of the vessel, though the line $h_2 h_2$ will continue to maintain a horizontal position. The plane of contact of the platforms will turn about the latter line and will not remain horizontal. If the accident takes place, for example, at the moment when the vessel, rolling some fifteen degrees to each side, has reached its extreme point of inclination on one side, the plane of contact of the platforms, at this moment horizontal, will thereupon be caused by the movement of the vessel to incline progressively to one and the same side to the extent of some thirty degrees. To avoid the inconvenience attendant upon such circumstances it must be possible to disconnect the motionless compartment from the damaged auxiliary motor, and to connect it with an ordinary, or adjuster, motor, which will replace it in its action on the axis $m$ $n$ during the time necessary to replace the axis of the pivot 31 in the diametral plane of symmetry of the vessel. This the operator will recognize by taking up a position in the diametral plane of symmetry of the vessel, when he will see in the transversal plane a projection of this axis 31, materialized as a rod, unite with a projection in the same plane of another vertical rod passing through the central point, the latter rod having been installed on the vessel in an upright position. The adjuster motor then being stopped, the motionless compartment, though continuing not to pitch, will roll with the rest of the vessel under the same conditions as any other part of the vessel, the coincidence of the two projections mentioned above being thereafter maintained during the oscillatory movements of the said vessel.

If either the auxiliary motor driving the pulley 27 (Figs. 4 and 5) or the auxiliary motor 40 (Fig. 6) become damaged, the axis of the pivot must in the same way be re-established in the transversal plane of the vessel, i. e. the plane which, when the vessel is at rest about its centre of gravity, is vertical and perpendicular to the diametral plane of symmetry. It is therefore in this diametral plane that the projections of the two rods mentioned above must be caused to coincide; the motionless compartment will then perform pitching movements under the same conditions as any other part of the vessel but will not roll.

The appliances necessary to effect these various operations are those generally used in connection with machinery and have not been shown in the drawings.

What I claim is:

1. In combination with an automatic stabilizing apparatus comprising, in the essence, toothed sectors gearing with four pinions the centres of which lie at each extremity of two diameters, perpendicular one with the other, of a circle rigidly secured to the vessel and horizontal when the said vessel is at rest; the said apparatus being characterized by the fact that during any oscillation of the vessel the pinions revolve on their axes with respect to the vessel, the number of revolutions turned being in proportion to the rotation of each respective axis about the above mentioned diameters; a device firmly attached to the vessel, controlled by the rotations of the pinions about their axes and mounted on two axes fixed to the vessel and parallel with respect to each of the above mentioned diameters, auxiliary motors transmitting said rotations, which they reverse, from said device to said axes, two rods maintained in a constantly horizontal position by said rotations, the axes of which rods passing compulsorily through one and the same fixed point in the vessel, and being horizontal when the vessel is at rest and perpendicular with respect to the directions of the two diameters; two flat platforms constructed to turn each about one of the said rods; both said platforms being compelled to remain parallel and both consequently being horizontal, a compartment which is intended to remain motionless during the pitching and rolling of the vessel securely attached to one of the said platforms, substantially as described.

2. In combination with an automatic stabilizing apparatus including toothed sectors gearing with four pinions the centers of which lie at each extremity to two diameters, perpendicular one with the other, of a circle rigidly secured to a vessel disposed horizontal when the vessel is at rest; said apparatus being characterized by the fact that during any oscillation of the vessel the pinions revolve on their axes with respect to the vessel, the number of revolutions turned being in proportion to the rotation of each respective axis about the above mentioned diameters; a device firmly attached to the vessel, controlled by the rotations of the pinions about their axes fixed to the vessel and parallel with respect to each of the above mentioned diameters, auxiliary motors transmitting said rotations which they reverse, from said device to said axes, two rods maintained in a constantly horizontal position by said rotations, the axes of which rods passing compulsorily through one and the same fixed point in the vessel and being horizontal when the vessel is at rest and perpendicular with respect to the directions of the two diameters, two flat platforms constructed to turn each about one of the said rods; an axis carried by one of the platforms, perpendicular to said platform and passing through the central point; a socket on the second platform, perpendicular to it and surrounding said axis; a set of friction rollers between the two platforms, and a compartment which is intended to remain motionless during the pitching and rolling of the vessel, securely attached to one of the said platforms, substantially as described.

In witness whereof I have hereunto set my hand in the presence of two witnesses.

LOUIS ISIDORE HENRY.

Witnesses:
 ROBERT HARDESTY,
 J. M. McGUAN.